E. S. STIMPSON.

BATTERY FEED FOR LOOMS.

APPLICATION FILED JULY 12, 1918.

Reissued Aug. 13, 1918.

14,504.

Inventor.
Edward S. Stimpson,
by Heard Smith & Tennant.
Attys.

UNITED STATES PATENT OFFICE.

EDWARD S. STIMPSON, OF HOPEDALE, MASSACHUSETTS, ASSIGNOR, BY MESNE ASSIGNMENTS, TO DRAPER CORPORATION, OF HOPEDALE, MASSACHUSETTS, A CORPORATION OF MAINE.

BATTERY-FEED FOR LOOMS.

14,504. Specification of Reissued Letters Patent. Reissued Aug. 13, 1918.

Original No. 1,269,975, dated June 18, 1918, Serial No. 114,682, filed August 14, 1916. Renewed March 11, 1918, Serial No. 221,863. Application for reissue filed July 12, 1918. Serial No. 245,148.

*To all whom it may concern:*

Be it known that I, EDWARD S. STIMPSON, a citizen of the United States, residing at Hopedale, county of Worcester, State of Massachusetts, have invented an Improvement in Battery-Feeds for Looms, of which the following description, in connection with the accompanying drawing, is a specification, like characters on the drawing representing like parts.

This invention relates to automatic filling replenishing mechanism for looms of the "Northrop" type in which the supply of fresh filling carriers or bobbins is maintained in a rotary battery, feeder or hopper from which upon the call for filling replenishment they are successively transferred to the running shuttle. This general type of mechanism is well known and familiar and reference may be had to my prior Patent No. 664,790, granted December 25, 1900, as an illustration of one form thereof.

The fresh filling carriers are positioned about the periphery of the hopper in equidistant peripheral seats. The hopper is rotated by the coöperation of a toothed dog moved by the transferrer and a ratchet wheel rotating with the hopper. Some classes of weaving require the filling carriers to be wound with a much larger amount of filling than others, and in such cases it is necessary that the peripheral seats in the hopper shall be farther apart than is required by the ordinary or normal sized filling carrier and filling. In such cases it is found difficult and frequently impossible to give the requisite amount of rotation to the hopper to bring a fresh filling carrier into proper discharging position while retaining the use of the transferrer as the actuating element for securing the hopper rotation.

The object of the present invention is to provide a simple and efficient construction whereby the ordinary type of transferrer such as shown in my prior Patent No. 664,790 with its dog may be retained as the actuating element for securing the rotation of the hopper, but whereby sufficient and required rotation may be given to the hopper to bring each fresh filling carrier accurately into proper discharging position.

These and other features of the invention will appear more fully from the accompanying description and drawings and will be particularly pointed out in the claims.

The drawings illustrate so much of a filling replenishing mechanism of the general type illustrated in my aforesaid Patent No. 664,790 as is necessary to an understanding of the present invention, a preferred form of which is shown embodied therein.

Figure 1:
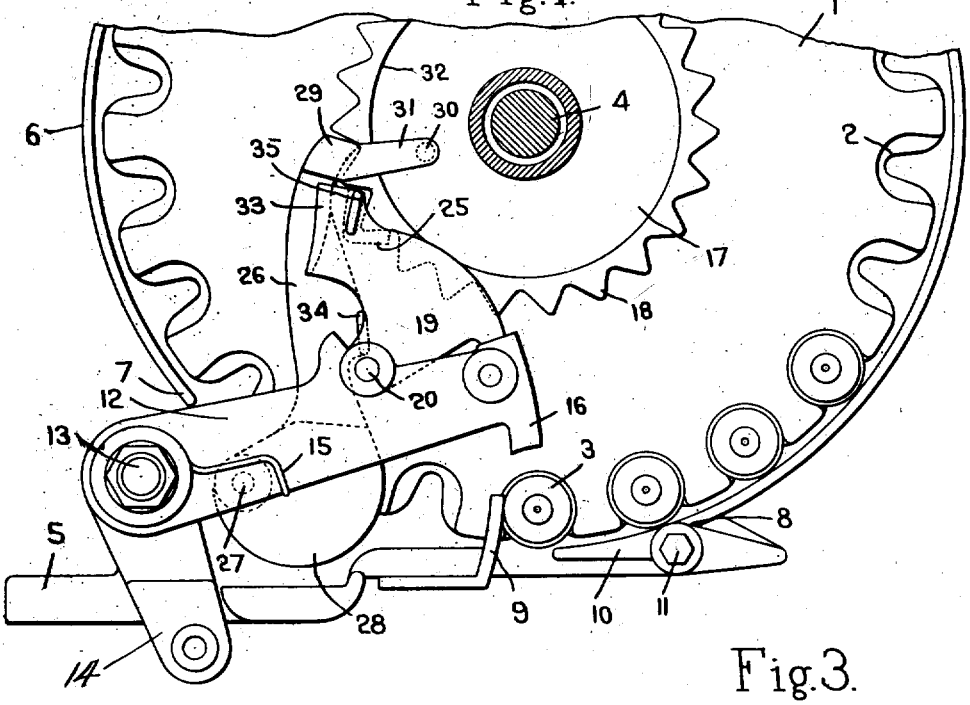
Figure 1 is an end elevation partially in transverse section of the hopper stand, a portion of the hopper and the transferrer and connecting parts.
Figure 2:
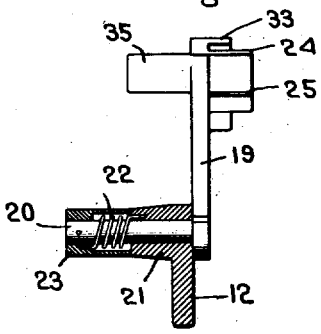
Fig. 2 is a rear elevation of the transferrer dog showing also the transferrer in vertical cross section.

The general construction of the type of loom illustrated being well known and familiar needs no extended description. The rotary battery, feeder or hopper comprises parallel disks between which the filling carriers such as bobbins are mounted in a circular series. But one of these disks, namely, the disk 1 is shown and is provided with the peripheral seats 2 for the butts of the bobbins 3. The hopper is rotatably mounted on the fixed stud 4 secured to the hopper stand 5 which is itself secured to the loom frame at one side of the loom. A circular flange 6 on the hopper stand surrounds the disk 1 to protect the heads of the bobbins and to retain them in place until they reach substantially their operative position, the flange terminating at the points 7 and 8.

The hopper stand is preferably provided with a relatively fixed abutment 9 against which the bobbin to be transferred is brought by the rotation of the hopper and during transfer from the hopper the bobbin is preferably guided against this abutment to direct it into the shuttle beneath. The flange 6 terminates opposite the abutment at the point 8 but is effectively prolonged by the bobbin support 10 pivoted at 11 to the hopper stand. This bobbin support serves to retain the bobbins nearest the abutment in their seats in the hopper and yields upon the passage of the bobbin to be transferred to permit its discharge from the hopper.

The mechanism illustrated for effecting transfer of the bobbins from the hopper is of a well known type and comprises the transferrer 12 pivoted on a horizontal stud 13 carried by the hopper stand 5 and provided with a depending arm 14 through which it is actuated upon the call for filling replenishment. The transferrer is normally elevated through the action of the spring 15 and is depressed to effect the transfer movement through the usual connections with the depending arm 14. At its free end the transferrer is provided with a downturned portion 16 to engage the bobbin and discharge it from its seat in the hopper disks.

The hopper is rotated to bring a fresh bobbin into position for transfer by the upward movement of the transferrer and it is to this feature that the invention more particularly relates.

The hopper is provided with a ratchet wheel 17 integral with or moving synchronously with the hopper and having such a number of teeth that the number of bobbin seats is divisible therein without remainder. Preferably these teeth 18 are equal in number to the bobbin seats 2 in the hopper. The transferrer 12 has pivotally mounted thereon a dog 19. This dog is provided with a pivotal stud 20 extending into a hub 21 on the transferrer. A helical spring 22 surrounds the stud 20, is secured at one end in a hub 21 and at the opposite end in a cap 23 pinned to the stud 20. This spring acts normally to hold the dog 19 against the free end of the transferrer as shown in Fig. 1. The dog 19 is provided with a plurality of teeth and preferably as illustrated with two teeth 24 and 25 projecting laterally therefrom and so positioned that upon the upward movement of the transferrer and dog these teeth successively engage the teeth of the ratchet wheel.

Retrograde movement of the hopper is prevented by the usual detent pawl 26 pivoted at 27 to the hopper stand 5 and movable by gravity due to the weighted foot 28 to bring the tooth 29 into engagement with the teeth of the ratchet wheel. A lateral lug 30 carried by an extension 31 of the detent pawl engages the inner periphery of the flange 32 of the ratchet wheel and thereby prevents disengagement of the detent pawl and ratchet. The dog 19 and the detent pawl 26 are provided, respectively, with the coöperating cam flange members 33 and 34 which act to insure that the tooth 24 of the dog shall enter squarely into the proper position in contact with the base of the proper ratchet tooth preparatory to the rotation of the hopper.

The actuating movement of the dog 19 takes place upon the upward movement of the transferrer 12, the cam member 33 at this time being in contact with the cam member 34 and the transferrer being depressed. In this movement the helical spring 22 acts to move the dog toward the ratchet wheel thus maintaining the cam flange member 33 in contact with the cam flange member 34. Thus the lateral movement of the dog toward the ratchet wheel is restrained and the movement of the dog guided to carry the first tooth as the tooth 24 along a definite path determined by the upward movement of the dog and the guiding action of the cam 33 upon the cam 34. These cam members 33 and 34 are so shaped that the path of movement of the dog is such that the tooth 24 is carried clear of the ratchet wheel and directly in front of the ratchet wheel teeth and brought into such a position that it is seated firmly against the base of the ratchet wheel tooth which it is to engage and thus the proper and efficient action of the parts secured. Upon the downward movement of the dog with the transferrer the cam member 33 again comes into contact with the cam member 34 and the reverse movement takes place withdrawing the dog until it is in position to begin its next actuating movement.

Figure 3:
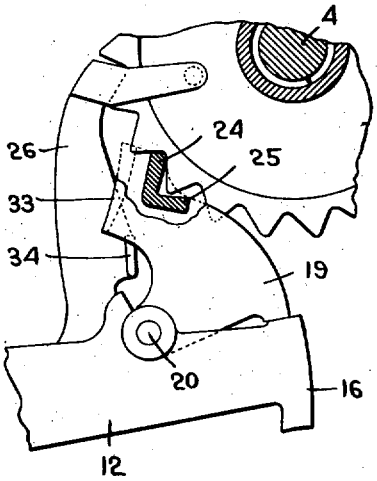
Fig. 3 is an end elevation partially in cross section of a portion of the mechanism shown in Fig. 1 with the parts in a different position.

Upon the upward movement of the transferrer 12 and dog 19 the tooth 24 which is then firmly seated against the base of the proper ratchet tooth causes the ratchet wheel to revolve and with it the hopper, thus bringing the fresh bobbin in its peripheral seat toward the abutment 9. This movement continues until the tooth 24 can no longer effect movement by coöperation with the tooth of the ratchet wheel with which it is in contact. Owing to the fact that the bobbin seats are more widely spaced than normal because of the heavily wound bobbins or filling carriers the movement thus given by the tooth 24 may be and frequently is insufficient to bring the fresh bobbin into contact with the abutment and thus into proper discharging position. The next tooth as the tooth 25, however, is so positioned that as the tooth 24 reaches the end of its effective action the tooth 25 comes into contact with the next successive tooth of the ratchet wheel and before the upward movement of the transferrer is completed acts to give an additional movement of rotation to the ratchet wheel sufficient to bring the fresh bobbin into proper discharging position and into contact with the abutment 9. In Fig. 3 the tooth 24 is shown in engaging position with the ratchet wheel and about to begin the movement of rotation while in Fig. 1 the tooth 24 is shown as having left engagement with the tooth of the ratchet wheel and the tooth 25 to be in engagement with the next successive tooth of the ratchet wheel and completing the movement of rotation. Thus, notwithstanding the widely spaced bobbin seats in the hopper periphery sufficient rotation of the hopper is secured to bring each bobbin successively and accurately into proper discharging position.

Means are provided as usual by which the dog 19 may be thrown out of engagement with the ratchet wheel to enable the feeder to be rotated and set by hand and for this purpose the handle 35 is provided on the dog to be grasped by the operator.

Having fully described my invention, what I claim as new and desire to secure by Letters Patent is:

1. An automatic weft replenishing loom comprising a rotary hopper provided with equi-distant peripheral bobbin seats, an abutment to guide the bobbins in their discharge from the hopper seats during transfer, a ratchet wheel connected to and rotating with the hopper and having the same number of teeth as there are bobbin seats, a transferrer pivotally mounted adjacent the hopper, and a dog pivotally mounted on the transferrer and provided with two teeth acting upon each upward movement of the transferrer successively to engage the teeth of the ratchet wheel and rotate said ratchet wheel to bring a bobbin into discharging position against said abutment.

2. An automatic weft replenishing loom comprising a rotary hopper provided with equi-distant peripheral bobbin seats, a ratchet wheel connected to and rotating with the hopper and having the same number of teeth as there are bobbin seats, a transferrer pivotally mounted adjacent the hopper, and a dog pivotally mounted on the transferrer and provided with two teeth to coöperate with the teeth of the ratchet wheel, the first of said teeth acting upon each upward movement of the transferrer to engage a tooth of the ratchet wheel and rotate said ratchet wheel and the second of said teeth acting upon the conclusion of the effective movement of the first tooth to engage the next successive tooth of the ratchet wheel and give a further rotation to said ratchet wheel thus to bring a bobbin into proper discharging position.

3. An automatic weft replenishing loom comprising a rotary hopper provided with equi-distant peripheral bobbin seats, a ratchet wheel connected to and rotating with the hopper and having such a number of teeth that the number of bobbin seats is divisible therein without remainder, a transferrer pivotally mounted adjacent the hopper, and a dog pivotally mounted on the transferrer and provided with a plurality of teeth acting upon each upward movement of the transferrer successively to engage the teeth of the ratchet wheel and rotate the said ratchet wheel to bring a bobbin into discharging position.

In testimony whereof I have signed my name to this specification.

EDWARD S. STIMPSON.